United States Patent Office 2,961,298
Patented Nov. 22, 1960

2,961,298

EXTRACTION OF IRON FROM IRON-BEARING TITANIFEROUS RAW MATERIALS

Matti Haakon August Tikkanen, Helsingfors, Finland, assignor to Nils Kristian Gustav Tholand, Sperryville, Va.

No Drawing. Filed Sept. 5, 1956, Ser. No. 608,001

Claims priority, application Sweden Sept. 9, 1955

5 Claims. (Cl. 23—202)

This invention relates to titanium metallurgy and more particularly to an improved method of separating iron from various iron-bearing titaniferous raw materials. The starting material used in the present process may be, for example, a titanium ore such as ilmenite or it may be a titanium-bearing raw material that has been beneficiated in any of various ways. Thus, in accordance with one known process a partial removal of the iron in ilmenite is effected by heating the ilmenite with coke to produce metallic iron and a titanium-bearing slag that still contains of the order of 15% iron. Such an iron and titanium containing slag is a suitable starting material for the present process.

Naturally occurring titanium is ordinarily associated with substantial amounts of iron from which it must be separated if it is to be used either for the manufacture of pigments or in elemental form for the various purposes for which titanium metal has been found useful. In accordance with one known separation process a titanium ore such as ilmenite is digested with strong sulfuric acid to produce a solution of iron and titanium sulfates from which the iron and titanium are separately recovered. However, this process consumes large quantities of concentrated acid and hence is quite expensive.

In order to avoid the high cost of this prior process, various proposals have been made directed to the selective removal of iron from iron and titanium containing raw materials. In one such process, described in German Patent 490,600, finely pulverized ilmenite is treated with an aqueous sulfuric acid of a concentration such that it dissolves the iron content of the ore but is too dilute to maintain the titanium in solution. In order to achieve a practicable rate of solution, the leaching of the ore is carried out in the presence of a reducing agent which may be a titanium (III) compound such as titanium (III) sulfate. Since removal of the iron by this process is incomplete, the titanium-containing residue is taken up in concentrated sulfuric acid, and the resulting solution is hydrolyzed to precipitate a relatively pure titanium oxide. The dilute sulfuric acid thus produced can be used for leaching iron from a further quantity of ilmenite ore.

While the process described in German Patent 490,600 possesses important advantages over prior processes, it still leaves something to be desired. Thus operating temperatures of the order of 170° C. to 180° C. are used, which means that the leaching reaction must be carried out under moderately high pressures, thus making it necessary to use relatively expensive equipment. Also, although the sulfuric acid solutions used can properly be referred to as dilute in relation to the concentrated acid previously employed, they still are fairly strong solutions. Moreover, a relatively long period of time is required to reduce the iron content of the ore to the desired extent.

It is accordingly an object of the present invention to provide an improved process for the selective leaching of iron from iron-bearing titaniferous raw materials. It is another object of the invention to provide a selective leaching process of this type which employs as a leaching agent relatively dilute acids, such as the by-product sulfuric acids produced in the manufacture of titanium pigments. It is still another object of the invention to provide a process of this type capable of being carried out at or close to atmospheric pressure. It is a still further object of the present invention to provide a process of this character that employs a more coarsely pulverized raw material than has previously been used in prior similar processes. Other objects of the invention will be in part obvious and in part pointed out hereafter.

As conducive to a clearer understanding of the present invention it may be pointed out that the several operating variables referred to above, such as acid concentration, temperature, reaction time, and degree of subdivision of the raw material are interdependent. As pointed out in detail hereafter, the present process is substantially more effective than the process described in German Patent 490,600, and this greater effectiveness can be demonstrated in any of several different ways. If, for example, the present process is carried out using the same raw material, acid concentration and operating temperature as the prior process, a given reduction in the iron content of the ore can be achieved in a substantially shorter period of time. In like manner, if all other variables are held constant the acid concentration or the operating temperature or both can be significantly reduced.

The improved effectiveness of the present process is achieved by utilizing either or both of two novel method steps, namely, (1) a preliminary roasting of the raw material in air or another oxidizing environment and (2) simultaneous leaching and grinding of the raw material. I have found that although as pointed out in German Patent 490,600 the selective leaching step of the process proceeds more satisfactorily in the presence of a reducing agent which converts the iron to the ferrous state, nevertheless the reactivity of the raw material is substantially enhanced by subjecting it to a preliminary oxidation treatment. It appears that this oxidation step may break up the crystal lattice structure of the ore and render the iron more readily accessible to the solvent acid. In any event, the data given hereafter show that when the ore is submitted to a preliminary oxidation such as, for example, by heating in air at a temperature of say 800° to 1350° C., a much more effective leaching action is attained.

Improved leaching action is also obtained by simultaneously leaching and grinding the ore. To this end the pulverized raw material is desirably mixed with a quantity of acid resistant grinding bodies, e.g. porcelain balls, as well as with the leaching acid, and agitated during the leaching period. The leaching may be satisfactorily carried out at a temperaure of say 60° to 150° C. The grinding bodies rub or brind the powder particles of the raw material, thus continually exposing fresh surfaces to the action of the leaching acid. While the preliminary roasting step and the grinding step can be used independently, they are desirably used in conjunction with one another to achieve optimum results.

In order to point out more fully the nature of the present invention the following specific examples are given of several different embodiments of the invention.

*Example 1*

A quantity of unroasted ilmenite ore containing about 37% iron and 46% titanium was ground to a grain size of less than 150 mesh. A cylindrical autoclave 10 cm. in diameter and 25 cm. in length was charged with 50 gms. of this powder, 1000 ml. of 10% by weight sulfuric acid, and a number of porcelain balls 1 cm. in diameter. The inside of the cover of the autoclave was made of copper to provide reducing conditions for the leaching step. The grinding action was effected by rotating the autoclave at about 20 r.p.m. The materials in the autoclave were maintained at a temperature of 140° C. for 3 hours, after which the autoclave was cooled and discharged. Analysis of the undissolved residue showed that it contained only 0.84% of iron.

In order to demonstrate the improvement achieved by utilizing the grinding balls, the same experiment was carried out without the porcelain balls in the autoclave. All operating conditions were the same except that the temperature was maintained at 160° C. Analysis of the residue showed that it contained 33.9% iron, that is, less than 10% of the iron content of the ilmenite had been extracted in spite of the fact that the reaction was carried out at a higher temperature.

*Example 2*

A quantity of ilmenite ore was ground to a grain size of less than 40 mesh and then heated in air at a temperature of 850° C. for 15 minutes. An autoclave of the type described in Example 1 was charged with 20 grams of the roasted ilmenite powder, 200 ml. of 10% sulfuric acid, and 20 one-centimeter porcelain balls. The autoclave was rotated at 20 r.p.m. and maintained at a temperature of 100° C. for 2 hours. At the end of this period the reaction mixture was cooled and the solid residue was analyzed. It was found that the iron content of the residue was 2.16%. Thus at a temperature of only 100° C. more than 90% of the iron had been removed.

*Example 3*

The following experiments (a) (b) and (c) demonstrate the synergistic effect that is achieved when both the preliminary roasting step and the grinding step of the present invention are used:

(a) A quantity of 40-mesh ilmenite was roasted in air at 850° C. for 15 minutes. An autoclave was charged with the roasted material as described in Example 2 except that no porcelain balls were included in the charge. The temperature was maintained at 100° C. for a period of 3 hours. Analysis of the undissolved residue showed that it contained 19.3% iron, that is, approximately half of the iron had been dissolved.

(b) In a second experiment the autoclave was charged with unroasted ilmenite and 10% sulfuric acid in the same proportions as in experiment (a), but grinding bodies i.e. porcelain balls were included in the charge. The operating temperature and reaction time were the same as in experiment (a). Analysis of the undissolved residue showed that it contained 25.3% iron.

(c) In a third experiment the procedure of experiment (b) was followed except that the ilmenite used had been pre-roasted as in experiment (a). Analysis of the residue showed that it contained only 1.6% iron.

The foregoing results show that the conjoint use of the roasting and grinding steps produces much more than a simple additive effect.

*Example 4*

The procedure of Example 2 was followed except that an autoclave temperature of 120° C. was used. Analysis of the residue at the end of 45 minutes showed that its iron content has been reduced to 1.26%.

When this same procedure was followed except that the preliminary roasting of the ilmenite was omitted, it was found that a reaction time of 3 hours was required to reduce the iron content of the residue to 3.3%.

*Example 5*

A quantity of unroasted ilmenite containing 37.1% iron and 46.1% titanium dioxide was ground to a grain size of 40-mesh. An autoclave of the type described in Example 1 was charged with 50 grams of this ilmenite powder, 1000 ml. of 10% sulfuric acid and 20 one-centimeter porcelain balls. The autoclave was rotated at 20–40 r.p.m. for a period of 3 hours. This procedure was carried out at a number of different temperatures with the results given below:

| Temp., ° C.: | Percent of iron dissolved |
| --- | --- |
| 100 | 40.0 |
| 120 | 95.0 |
| 140 | 98.0 |
| 160 | 98.7 |
| 180 | 98.4 |
| 200 | 98.2 |

*Example 6*

The procedure of Example 5 was followed except that 20% sulfuric acid was used at several different reaction temperatures with the following results:

| Temp., ° C.: | Percent of iron dissolved |
| --- | --- |
| 100 | 93.6 |
| 120 | 99.0 |
| 140 | 99.3 |
| 200 | 99.3 |

*Example 7*

The procedure of Example 5 was followed except that 3% sulfuric acid was used with the following results:

| Temp., ° C.: | Percent of iron dissolved |
| --- | --- |
| 140 | 51.1 |
| 200 | 87.2 |

*Example 8*

The procedure of Example 5 was followed except that varying acid concentrations were used at an operating temperature of 120° C. with the following results:

| Percent sulfuric acid: | Percent of iron dissolved |
| --- | --- |
| 10 | 95.0 |
| 20 | 99.0 |
| 30 | 99.3 |
| 40 | 99.2 |
| 50 | 99.3 |

*Example 9*

The procedure of Example 8 was followed except that a reaction temperature of 140° C. was used with the following results:

| Percent sulfuric acid: | Percent of iron dissolved |
| --- | --- |
| 10 | 98.0 |
| 20 | 99.3 |
| 30 | 99.1 |
| 40 | 99.3 |

*Example 10*

The procedure of Example 8 was followed except that a reaction temperature of 200° C. was used with the following results:

| Percent sulfuric acid: | Percent of iron dissolved |
| --- | --- |
| 3 | 87.1 |
| 6 | 95.0 |
| 10 | 98.2 |
| 20 | 99.3 |

*Example 11*

The procedure of Example 5 was followed using a reaction temperature of 120° C. with several different reaction times, and the following results were obtained:

| Reaction time, hours: | Percent of iron dissolved |
| --- | --- |
| 1 | 56.2 |
| 2 | 90.3 |
| 3 | 95.0 |

Example 12

The procedure of Example 11 was followed except that a reaction temperature of 140° C. was used with the following results:

Reaction time, hours: Percent of iron dissolved
1 _____ 93.6
2 _____ 98.5
3 _____ 98.2

Example 13

The procedure of Example 11 was followed except that a reaction temperature of 160° C. was used with the following results:

Reaction time, hours: Percent of iron dissolved
1 _____ 97.5
2 _____ 98.2
3 _____ 98.7

Example 14

The procedure of Example 5 was followed except that the autoclave was modified by replacing the copper-lined cover with a glass cover and using hydrogen gas as a reducing agent. The partial pressure of hydrogen within the autoclave was maintained at about 3 atmospheres during the leaching reaction. Runs were made at several different operating temperatures with the following results:

Temp., ° C.: Percent of iron dissolved
120 _____ 98.5
140 _____ 99.0
160 _____ 99.1
180 _____ 98.8

Example 15

The procedure of Example 5 was followed except that the ilmenite was submitted to a preliminary roasting treatment as in Example 2. Runs were made at various leaching temperatures with the following results:

Temp., ° C.: Percent of iron dissolved
60 _____ 39.7
80 _____ 66.3
100 _____ 98.0
120 _____ 98.4
140 _____ 98.2

A comparison of the above results with those given in Example 5 shows the substantial advantage gained by pre-roasting the ilmenite.

Example 16

The procedure of Example 15 was followed except that 20% sulfuric acid was used and the reaction time was reduced to 1 hour. Data were obtained for both roasted and unroasted ilmenite as follows:

| Temp., ° C. | Percent of iron dissolved | |
|---|---|---|
| | Roasted charge | Unroasted charge |
| 100 | 68.2 | 8.1 |
| 120 | 98.3 | 56.2 |
| 140 | 98.1 | 93.6 |

Example 17

The procedure of Example 5 was followed using a leaching temperature of 100° C., a reaction time of 3 hours and 10% sulfuric acid. Runs were made with roasted and unroasted ilmenite with and without the use of the porcelain grinding bodies, with the following results:

| | Percent of iron dissolved | |
|---|---|---|
| | Unroasted charge | Roasted charge |
| without grinding | 0.0 | 65.2 |
| with grinding | 40.0 | 98.0 |

Example 18

A material having substantially the composition of the titanium-bearing slag referred to at the beginning of the present specification was treated according to the procedure of Example 5 at a leaching temperature of 100° C. at various acid concentrations as follows:

| Percent acid | Percent of iron dissolved | |
|---|---|---|
| | Unroasted charge | Roasted charge |
| 2.5 | 0.0 | 59.2 |
| 5.0 | 1.8 | 81.6 |
| 10.0 | 38.8 | 98.1 |
| 20.0 | 92.1 | 98.2 |
| 30.0 | 94.0 | 98.4 |
| 50.0 | 98.3 | 98.2 |

Example 19

The procedure of Example 5 was followed using a leaching temperature of 100° C. with various reaction times as follows:

| Reaction time, hours | Percent of iron dissolved | |
|---|---|---|
| | Unroasted charge | Roasted charge |
| 1 | 14.2 | 68.2 |
| 2 | 27.4 | 87.4 |
| 3 | 40.0 | 98.0 |

Example 20

The procedure of Example 19 was followed except that a 20% acid was used:

| Reaction time, hours | Percent of iron dissolved | |
|---|---|---|
| | Unroasted charge | Roasted charge |
| 1 | 36.8 | 88.4 |
| 2 | 67.9 | 98.1 |
| 3 | 93.6 | 98.2 |

Example 21

In order to determine the effect, if any, of variations in the roasting temperatures, samples of ilmenite were roasted at various temperatures and then leached at 100° C. in accordance with the procedure of Example 5 with the following results:

Oxidation temp., ° C.: Percent of iron dissolved
800 _____ 98.3
1000 _____ 98.1
1200 _____ 98.4

The foregoing examples show that the present invention provides a process capable of achieving the several objectives set forth at the beginning of the present specification. It is apparent that the preliminary roasting of the raw material and the use of grinding bodies during the leaching step each individually produces a significant increase in the amount of iron dissolved from the raw material under a given set of conditions. Moreover, as particularly illustrated by Examples 3 and 17, when both the preliminary roasting steps and grinding steps are employed a synergistic effect is achieved and the reduction in iron content of the raw material is substantially greater than would be expected from a consideration of the results obtained by using these two steps independently.

It is of course to be understood that the foregoing description is intended to be illustrative only and that numerous changes can be made in the materials, proportions and operating conditions specifically mentioned without departing from the spirit of the invention as defined in the appended claims.

I claim:

1. A method for selectively leaching iron from an iron-bearing titaniferous raw material which comprises roasting the raw material in finely divided form in an oxidizing environment to convert at least a part of the ferrous iron content thereof to ferric iron and thereby break up the crystal lattice structure of said material, mixing the finely divided roasted material with aqueous sulfuric acid and a quantity of non-reactive grinding bodies, and heating and agitating the resulting mixture under reducing conditions to dissolve iron from said raw material while simultaneously mechanically abrading the particles of said material to present fresh surfaces for reaction with said acid.

2. A process for selectively leaching iron from an iron-bearing titaniferous raw material, which consists in roasting said material in an oxidizing environment at a temperature of 800° to 1350° C., and thereafter treating the roasted material with hot aqueous sulfuric acid under reducing conditions to leach iron therefrom.

3. A method for selectively leaching iron from an iron-bearing titaniferous raw material which comprises roasting the raw material in finely divided form in an oxidizing environment to convert at least a part of the ferrous iron content thereof to ferric iron, mixing the finely divided roasted material with aqueous sulfuric acid and grinding bodies that are essentially unreactive with said acid, and heating and agitating the resulting mixture in the presence of a reducing agent to dissolve iron from said raw material while simultaneously mechanically abrading the particles of said material to present fresh surfaces for reaction with said acid.

4. A method according to claim 3 and wherein said reducing agent is a metal that forms part of the lining of a container in which the acid treatment is carried out.

5. A method according to claim 3 and wherein said reducing agent is hydrogen gas.

References Cited in the file of this patent

UNITED STATES PATENTS

| | | |
|---|---|---|
| 1,232,249 | Dugan | July 3, 1917 |
| 1,842,092 | Harshaw et al. | Jan. 19, 1932 |
| 1,891,911 | Brode et al. | Dec. 27, 1932 |
| 2,021,671 | Skinner | Nov. 19, 1935 |
| 2,098,054 | McBerty | Nov. 2, 1937 |
| 2,290,111 | Merriam et al. | July 14, 1942 |
| 2,339,808 | Ravnestad et al. | Jan. 25, 1944 |
| 2,776,877 | Cardon | Jan. 8, 1957 |